UNITED STATES PATENT OFFICE.

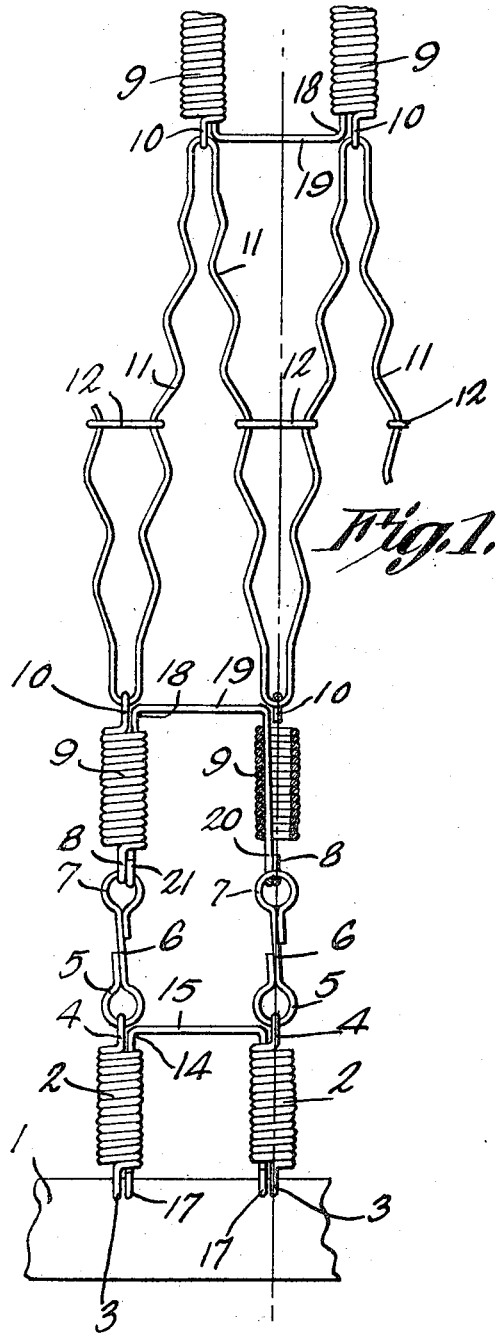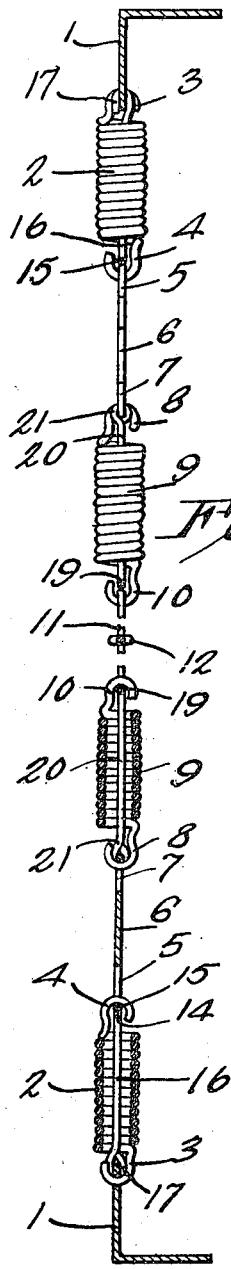

CHARLES GILES SMITH, OF LAKELAND, MICHIGAN.

BED-SPRING.

1,241,293.   Specification of Letters Patent.   Patented Sept. 25, 1917.

Application filed November 21, 1916. Serial No. 132,630.

*To all whom it may concern:*

Be it known that I, CHARLES GILES SMITH, a citizen of the United States, residing at Lakeland, in the county of Livingston and State of Michigan, have invented a new and useful Bed-Spring, of which the following is a specification.

The device forming the subject matter of this application is a spring bed and the invention aims to provide novel means whereby, when either the inner or the outer helical springs of the bed are elongated to a predetermined extent, further elongation will be stopped, thereby preventing an undue straining of the springs.

A further object of the invention is to provide means which will not only limit the elongation of the springs, but, as well, will connect the springs so that they cannot yield transversely to an undesirable extent.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings:—

Figure 1 is a top plan wherein appears a portion of a spring bed constructed in accordance with the present invention; and Fig. 2 is a sectional detail showing a spring bed constructed in accordance with the present invention, parts being broken away.

In the accompanying drawings, the numeral 1 indicates the end rails of a bed frame. The numeral 2 designates outer helical springs connected by means of hooks 3 with the end rails 1. At their inner ends, the outer helical springs 2 are supplied with hooks 4 engaging eyes 5 constituting parts of connectors 6 terminating in eyes 7 engaged by hooks 8 on the outer ends of inner helical springs 9, the springs 9 being provided at their inner ends with hooks 10 with which is engaged a bed support which may be a corrugated wire 11 threaded zigzag through the hooks 10, the constituent arms of the wire 11 being united by transverse links 12.

The invention comprises a stop bail 14 including an intermediate portion 15 spaced from the inner ends of the outer helical springs 2. The stop bail 14 includes arms 16 extended through the springs 2 and provided with hooks 17 engaging the rails 1.

At 18 there appears a stop-bail including an intermediate portion 19 spaced from the inner ends of the inner helical springs 9. The stop-bail 18 includes arms 20 extended through the inner helical springs 9, the arms 20 terminating in hooks 21 which are engaged with the eyes 7 of the connectors 6.

When the outer helical springs 2 yield to a predetermined extent, then the innermost convolutions of the springs 2 will be engaged by the intermediate portion 15 of the stop bail 14, and a further, undesirable elongation of the springs 2 will be prevented. In a similar manner, when the inner helical springs 9 yield to a predetermined degree, then the innermost convolutions of the springs 9 will be engaged by the intermediate portion 19 of the stop-bail 18, and a further, undesirable elongation of the said springs will be prevented.

The element 14, being of U shape, and comprising arms 16 which pass through the springs 2, not only serves as a stop limiting the elongation of the springs 2 but, as well, anchors or connects the springs 2 against undesirable lateral movement. The same observation holds true with respect to the stop-bail 18 and the inner helical springs 9.

Having thus described the invention, what is claimed is:—

1. In a device of the class described, a frame; helical springs located side by side and connected at their outer ends with the frame; a bed support; means for attaching the bed support to the inner ends of the springs; and a stop bail including arms extended entirely through the springs and connected at their outer ends with the frame, and an intermediate portion located in front of the inner ends of the springs, and connecting the inner ends of the arms, the intermediate portion of the bail constituting a stop which limits the expansion of both springs, and constituting, also, a tie between the arms, whereby the arms will regulate and control the lateral movements of both springs, throughout the entire length of each spring.

2. In a device of the class described, a frame; outer springs; means for securing the outer ends of the outer springs to the frame; inner helical springs located side by side; connectors uniting the outer ends of the inner springs with the inner ends of the outer springs; a stop-bail including an intermediate portion spaced from the inner ends of the inner springs, and arms extended through the inner springs; means for uniting the arms with the connectors; a bed support; and means for connecting the bed support with the inner ends of the inner springs.

3. In a device of the class described, a frame; outer helical springs located side by side and having their outer ends united with the frame; a stop-bail including an intermediate portion spaced from the inner ends of the outer springs, and arms extended through the outer springs; means for anchoring the arms with respect to the frame; inner helical springs located side by side; connectors uniting the outer ends of the inner springs with the inner ends of the outer springs; a stop-bail including an intermediate portion spaced from the inner ends of the inner springs, and arms extended through the inner springs; means for uniting the arms of the last specified bail with the connectors; a bed support; and means for connecting the bed support with the inner ends of the inner springs.

In testimony that I claim the foregoing as my own, I have hereto affixed my signature in the presence of two witnesses.

CHARLES GILES SMITH.

Witnesses:
JOHN A. HAGMAN,
M. J. LARKIN.